P. V. HIXSON.
Harrow Teeth.
No. 82,835. Patented Oct. 6, 1868.
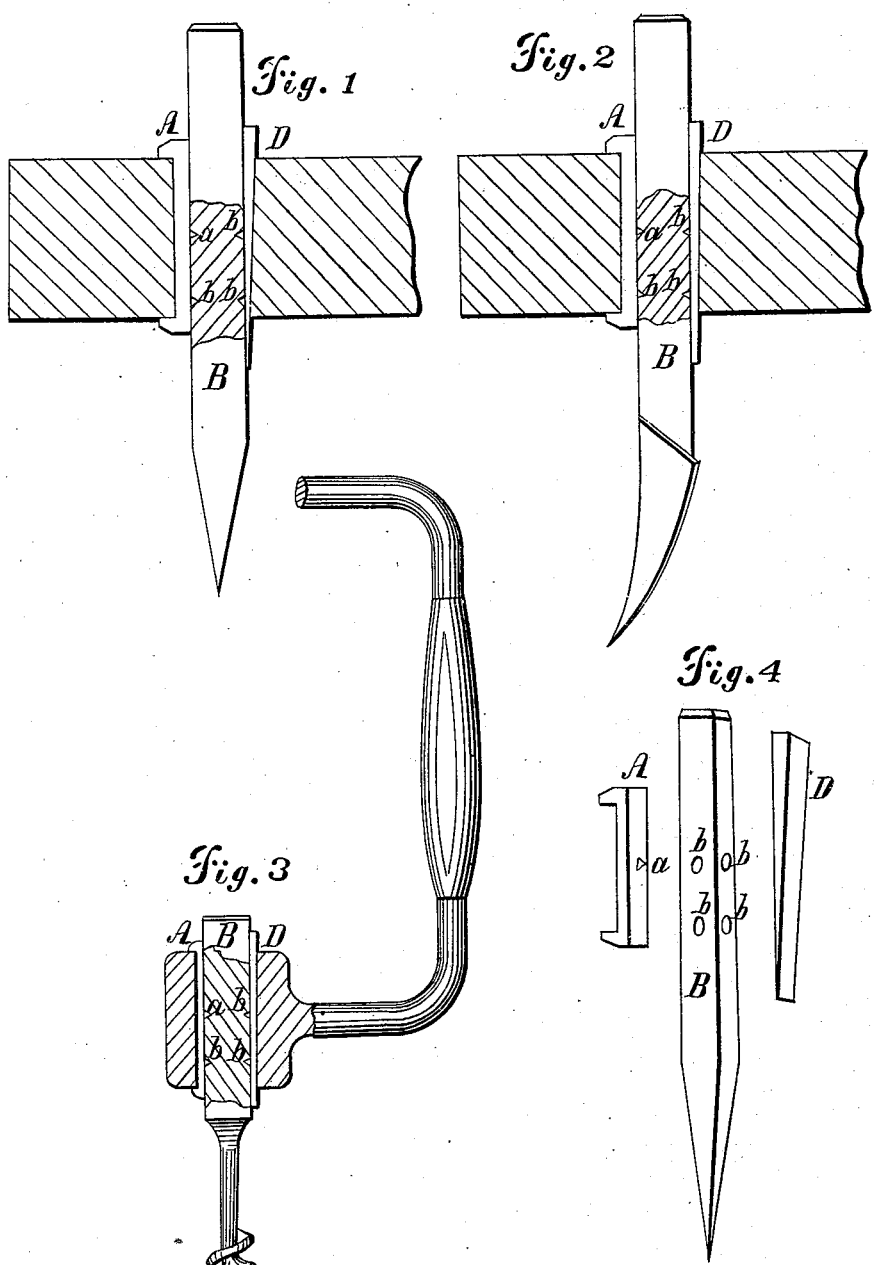

United States Patent Office.

P. V. HIXSON, OF TIOGA, PENNSYLVANIA.

Letters Patent No. 82,835, dated October 6, 1868.

IMPROVEMENT IN HARROW-TEETH.

*The Schedule referred to in these Letters Patent and making part of the same.*

TO ALL WHOM IT MAY CONCERN:

Be it known that I, P. V. HIXSON, of Tioga, in the county of Tioga, and State of Pennsylvania, have invented new and useful Improvements in Fastening for the Shanks of Harrow-Teeth; and I do hereby declare that the following is a full, clear, and exact description thereof, which will enable those skilled in the art to make and use the same, reference being had to the accompanying drawings, forming part of this specification, in which—

Figure 1 is a sectional view of a harrow-tooth secured by my improved fastening.

Figure 2 are perspective views, exhibiting the parts of the device.

Similar letters of reference indicate corresponding parts.

It consists of a gib, A, provided with studs, bosses, or projections, as shown at $a$, which fit into corresponding indentations, slots, or cavities, $b$, on each of the faces of the shank of the tool or implement, B. as shown.

A tapering key or wedge, D, serves to connect the parts firmly together within the mortise or hole in the frame or handle, as shown.

By this simple and inexpensive device, the teeth of harrows can be withdrawn readily and turned to present a new cutting-edge when the others are worn.

This is an important advantage in harrowing hard soil, which requires that the harrow-teeth be sharp in order to take an effective hold on the ground.

When harrow-teeth are secured in my improved manner, the whole set can be withdrawn and turned in a few minutes, which operation is not possible when the teeth are driven directly through holes in the frame, as heretofore done, for they then require to be driven out with a hammer, which so batters the points that the teeth have to be sharpened by a smith.

Another advantageous feature in my invention exists in the fact that by forming several indentations along the length of the shank of the tool or implement, the same may be shortened or lengthened, as circumstances require.

In the case of the harrow-teeth, this is peculiarly desirable, as in the dragging of loose, mellow soil, the teeth should be longer than when compact sod-ground is being dragged, some farmers being obliged to employ two separate harrows on this account.

Another advantage in the application of this device, and an important one, consists in making the indentations in the shank on all four of its faces, so that if one face of the point of the tooth becomes worn, another can be turned towards the line of draught. Such an arrangement cannot be made where there are serrations in the gib, and corresponding serrations in one side only of the shank; nor can serrations be made in all the faces of the shank, as such construction would interfere with the action of the wedge for holding the teeth in place.

The gibs and wedges may be manufactured of different sizes, and supplied to the farmers, who can apply them to the harrows already in use with but little expense, as it will be only required to punch indentations in the harrow-teeth corresponding to the projections on the gib, and enlarge mortises in the harrow-frame to admit the gib and key.

I do not claim the employment of a serrated gib with corresponding serrations on one of the faces of the shank of the harrow-tooth; but What I do claim as my invention, and desire to secure by Letters Patent, is—

The gib A, provided with projections $a$, in combination with the shank B, provided with corresponding indentations in all of its four faces, and tightening-key D, all constructed and operated in the manner and for the purpose set forth.

P. V. HIXSON.

Witnesses:
JOHN D. McEWING,
T. A. WICKHAM.